United States Patent Office 3,369,909
Patented Feb. 20, 1968

3,369,909
METHOD FOR MAKING FLUID
OLEAGINOUS SUSPENSION
William Frederick Schroeder and Joseph Roy Wynne, Memphis, Tenn., assignors to National Dairy Products Corporation, New York, N.Y., a corporation of Delaware
No Drawing. Filed May 18, 1964, Ser. No. 368,329
5 Claims. (Cl. 99—118)

ABSTRACT OF THE DISCLOSURE

A method for the manufacture of a stable, two phase, fluid oleaginous suspension including heating a mixture of an edible liquid oil and between about 8 percent and about 13 percent, by weight of the suspension, of a triglyceride hard fat containing at least about 85 percent $C_{18}$ and longer fatty acid radicals having an I.V. of less than about 8 to an elevated temperature sufficient to melt the hard fat and destroy crystal nuclei, cooling the mixture to a temperature within the beta crystalline range for the suspension and maintaining the temperature of the mixture within the beta crystalline range until substantially all of the hard fat has crystallized in the beta phase.

---

This invention relates generally to an improved fluid oleaginous composition, and more particularly it relates to an improved, stable, pourable, two-phase fluid oleaginous suspension, and to a method of making such a fluid oleaginous suspension.

A shortening is generally defined as an oleaginous composition which is plastic at ambient temperatures and which is suitable for use in baking and frying. Shortenings generally include natural fats, such as butter and lard, treated natural fats, and hydrogenated vegetable oils, or mixtures thereof.

Various attempts have been made to provide a fluid oleaginous suspension which may be used as a shortening. Such suspensions are desirable in that they can be readily handled and measured at room temperature. Such suspensions are also more stable than vegetable oils when employed in deep fat frying processes.

Fluid oleaginous materials suitable for baking and frying have been prepared in accordance with two general procedures. In accordance with one procedure, suitable emulsifiers such as lecithin and/or various mono- and diglycerides are substantially dissloyed in a liquid vegetable oil. In accordance with a second procedure, a fluid suspension of a hard fat in a liquid oil is prepared. As used herein, a "hard fat" is defined as an edible fat that is normally solid at room temperature.

A fluid suspension of a hard fat in a vegetable oil may be prepared by mixing finely divided particles of hard fat with a vegetable oil, or by crystallizing a hard fat from a heated liquid mixture of a hard fat and liquid oil. In order to obtain a fluid oleaginous suspension, it is generally desirable that the hard fat be in the beta crystalline phase.

However, known fluid oleaginous suspensions of a hard fat in a liquid vegetable oil have not been altogether satisfactory. Known processes of manufacturing such fluid suspensions have generally required rigid control of the temperature at which the hard fat is crystallized. These known processes also normally include a "tempering" step wherein the hard fat is initially crystallized in the alpha or beta prime phase and the suspension is thereafter tempered in order to convert the crystalline state of the hard fat into the beta phase.

It would be desirable to provide a pourable fluid oleaginous suspension comprising a suspension of a hard fat in a liquid triglyceride oil which may be prepared in accordance with a convenient method which does not require rigid control of the crystallization temperature or tempering of the suspension. By pourable, it is meant an oleaginous suspension which is flowable under gravity alone.

It is a principal object of the present invention to provide an improved two-phase fluid oleaginous suspension. A further object is to provide a method for the manufacture of an improved stable, pourable, two-phase fluid oleaginous suspension. An additional object is to provide an improved two-phase fluid oleaginous suspension which remains pourable and which does not separate during storage. An additional object is to provide a convenient method for the manufacture of an improved pourable two-phase oleaginous suspension which does not require tempering of the oleaginous suspension.

Generally, the present invention is directed to an improved, stable, pourable, two-phase fluid oleaginous suspension, and to a method of manufacturing such a fluid suspension wherein a heated mixture of an edible liquid triglyceride oil and a hard fat is cooled to a temperature within the beta crystalline range of the hard fat in the suspension to cause crystallization of the hard fat in the form of finely divided crystals in the beta phase.

More specifically, the present invention is directed to a stable, pourable, two-phase fluid oleaginous suspension comprising an edible liquid triglyceride oil and from about 8 percent to about 13 percent by weight of the suspension of a crystalline hard fat, substantially all of the hard fat being in the beta phase crystal form. The crystalline hard fat comprises at least about 85 percent $C_{18}$ or higher fatty acid residues, and has an Iodine Value (I.V.) of less than 8.0.

It has been discovered that the composition of the hard fat that is crystallized and suspended in the liquid triglyceride oil is critical. It is known to provide an oleaginous suspension by direct crystallization of a hard fat in the beta phase wherein the fluid shortening suspension contains at least 15 percent hard fat, preferably 25 percent to 60 percent hard fat. In accordance with known procedures, when the oleaginous suspension contains less than 15 percent hard fat, and the hard fat is directly crystallized in the beta phase, the suspension is not stable and separates upon storage. In some instances the suspension becomes so viscous as to be non-pourable.

However, in accordance with the present invention, a stable, pourable, two-phase fluid oleaginous suspension may be obtained which comprises less than about 13 percent hard fat by direct crystallization of the hard fat in the beta phase. In order to achieve a stable, pourable, two-phase oleaginous suspension, the hard fat must comprise triglycerides containing at least about 85 percent $C_{18}$ or longer fatty acid radicals. It has been found that if the hard fat comprises triglycerides having less than 85 percent $C_{18}$ or longer fatty acid radicals the fluid suspension, when crystallized directly in the beta phase, will be unstable and will separate during storage. However, when the hard fat comprises triglycerides containing at least about 85 percent $C_{18}$ or longer fatty acid radicals, the fluid suspension may be directly crystallized in the beta phase to provide a stable, pourable, two-phase fluid oleaginous suspension which will not separate during storage.

The hard fat may comprise tristearin, or it may be hydrogenated vegetable oil or a mixture of vegetable oils, provided that triglyceride content is in the above specified range. While the hard fat should have an I.V. of less than about 8.0, as above pointed out, it desirably has an I.V. of less than about 5, preferably less than about 2. It has been determined that if the hard fat has an I.V. greater than about 8.0, the fluid oleaginous suspension will be unstable even when the hard fat comprises triglycerides containing at least 85 percent $C_{18}$ or longer fatty acid radicals.

The liquid triglyceride oil, in which the hard fat is suspended, may comprise any of the normally liquid, edible, triglyceride oils. Generally, the liquid triglyceride oils comprise cottonseed oil, soybean oil, peanut oil, corn oil, linseed oil, sunflower seed oil, olive oil, safflower seed oil, fish oils or mixtures thereof. The liquid triglyceride oil may be winterized if desired and/or may be slightly hydrogenated.

As above mentioned, the hard fat is present in the fluid oleaginous suspension in an amount of about 8 percent to about 13 percent by weight of the suspension, but is preferably present at a level of from about 10 percent to about 13 percent. If less than about 8 percent hard fat is employed, the fluid suspension may be unstable and may separate during storage. If greater than about 13 percent hard fat is utilized, the suspension may become viscous and may not be pourable, particularly at low temperatures. However, a stable, pourable, two-phase fluid oleaginous suspension, which is stable and pourable at desired temperatures, may be readily obtained when the fluid shortening comprises from about 8 percent to about 13 percent hard fat.

Various emulsifiers, such as mono- and/or di-glycerides, may be mixed with the fluid oleaginous suspension. However, the emulsifiers should not be of such type or added in such amounts as to interfere with the suspension of hard fat.

In accordance with the method of the present invention, a stable, pourable, two-phase fluid oleaginous suspension may be manufactured from a heated mixture of a triglyceride oil and a hard fat blended together in the above indicated proportions. The mixture of triglyceride oil and hard fat is heated to a temperature sufficient to melt the hard fat and destroy all crystal nuclei present therein. Generally, melting of the hard fat and destruction of the crystal nuclei may be carried out by heating the mixture to a temperature above about 135° F., preferably to a temperature of about 160° F. In some instances where the hard fat comprises a relatively large amount of $C_{20}$ and longer fatty acid radicals, it may be necessary to heat the mixture to about 180° F. or higher to effect the desired destruction of crystal nuclei. It is desirable to maintain the heated mixture at the elevated temperature for a few minutes to insure that all of the crystal nuclei will be destroyed.

The liquid mixture of triglyceride oil and hard fat is then cooled to a temperature within the beta crystallization range whereupon crystallization of the hard fat directly into the beta phase occurs. The term "beta crystalization range" as used herein is defined as that temperature range within which the hard fat present in the mixture crystallizes directy into the beta phase. The beta crystalization range for a particular shortening suspension is related to the composition and amount of hard fat present in the oleaginous suspension. Generally, the smaller the amount of hard fat present in the oleaginous suspension, the lower will be the lower limit of the beta crystalline range. In most instances, the beta crystalline range for a two-phase fluid oleaginous suspension of the present invention will be between about 100° F. and about 130° F.

The cooling of the heated mixture of triglyceride oil and hard fat to within the beta crystallization range may be carried out in various ways. It is generally preferable, but not necessary, to agitate the liquid mixture during cooling to expedite cooling and to insure uniform cooling of the mixture. If desired, the cooling of the liquid mixture may be carried out in a scraped wall heat exchanger. The liquid mixture is desirably cooled to a temperature that is at the lower end of the beta crystallization range to provide for rapid crystallization of the hard fat into the beta phase.

During crystallization, the temperature of the oleaginous suspension may rise due to the heat of crystallization of the hard fat, and in some instances it may be necessary to cool the oleaginous suspension during crystallization in order to prevent the temperature of the suspension from exceeding the upper limit of the beta crystallization range. The oleaginous suspension is held at a temperature within the beta crystallization range until substantially all of the hard fat is crystallized in the beta phase. Generally, substantially complete crystallization will be obtained within a period of 20 to 60 minutes.

The fluid oleaginous suspension may then be further cooled and packaged, or may be packaged at a temperature within the beta crystallization range, as may be desired.

The two-phase fluid oleaginous suspension obtained by the described process is stable and pourable at desired temperatures. The fluid oleaginous suspension, when crystallized directly in the beta phase in accordance with the described method, does not need to be tempered in order to obtain a stable, pourable, two-phase fluid suspension.

*Example 1*

A fluid oleaginous suspension was prepared by mixing together winterized soybean oil and about 12 percent by weight of tristearin hard fat, based on the weight of the mixture. The mixture was heated to 160° F. and held at this temperature for 15 minutes to insure that all of the tristearin was melted and that all crystal nuclei were destroyed. The liquid mixture was then cooled to between 100° F. and 105° F. under conditions of mild agitation whereupon crystallization of the hard fat directly in the beta phase was initiated. The fluid oleaginous suspension was maintained at a temperature between 100° F. and 105° F. for thirty minutes during which time substantially all of the tristearin was crystallized directly in the beta phase. The suspension of hard fat and liquid oil was then cooled to 85° F. and packaged in suitable containers.

A two-phase fluid shortening suspension was obtained which was stable and pourable over a temperature range of 50° F. to 100° F.

It can be seen that an improved fluid oleaginous suspension has been provided which is stable and pourable over an extended temperature range. A method has also been provided whereby a hard fat having a particular composition may be directly crystallized in the beta phase to provide a stable, pourable, two-phase fluid oleaginous suspension.

Although certain features of the invention have been set forth with particularity in order to describe the invention, other alternative embodiments, considered to be within the skill of the art, are contemplated.

Various of the features of the invention are set forth in the following claims.

What is claimed is:

1. A method for the manufacture of a stable, two-phase fluid oleaginous suspension, which method includes heating a mixture of an edible liquid triglyceride oil and about 8 percent to about 13 percent hard fat by weight of the suspension, said hard fat comprising a triglyceride containing at least about 85 percent $C_{18}$ and longer fatty acid radicals, and having an I.V. of less than 8.0, holding said mixture at an elevated temperature for a time sufficient to melt the hard fat and destroy crystal nuclei, directly cooling the mixture to a temperature within the beta crystalline range for the suspension, and maintaining the temperature of the mixture within the beta crystalline range until substantially all of the hard fat is crystallized in the beta phase.

2. A method for the manufacture of a stable, two-phase fluid oleaginous suspension, which method includes heating a mixture of an edible liquid triglyceride oil and about 8 percent to about 13 percent hard fat by weight of the suspension, said hard fat comprising a triglyceride containing at least about 85 percent $C_{18}$ and longer fatty acid radicals, and having an I.V. of not more than 5.0, holding said mixture at an elevated temperature for a time sufficient to melt the hard fat and destroy crystal nuclei, directly cooling the mixture to a temperature within the beta crystalline range for the suspension, and maintaining the temperature of the mixture within the beta crystalline range until substantially all of the hard fat is crystallized in the beta phase.

3. A method for the manufacture of a stable, two-phase fluid oleaginous suspension, which method includes heating a mixture of an edible liquid triglyceride oil and about 8 percent to about 13 percent hard fat by weight of the suspension, said hard fat comprising a triglyceride containing at least about 85 percent $C_{18}$ and longer fatty acid radicals, and having an I.V. of not more than 2.0, holding said mixture at an elevated temperature for a time sufficient to melt the hard fat and destroy crystal nuclei, directly cooling the mixture to a temperature within the beta crystalline range for the suspension, and maintaining the temperature of the mixture within the beta crystalline range until substantially all of the hard fat is crystallized in the beta phase.

4. A method for the manufacture of a stable, two-phase fluid oleaginous suspension, which method includes heating a mixture of an edible liquid triglyceride oil and about 10 percent to about 13 percent hard fat by weight of the suspension, said hard fat comprising a triglyceride containing at least about 85 percent $C_{18}$ and longer fatty acid radicals, and having an I.V. of not more than 2.0, holding said mixture at an elevated temperature for a time sufficient to melt the hard fat and destroy crystal nuclei, directly cooling the mixture to a temperature within the beta crystalline range for the suspension, and maintaining the temperature of the mixture within the beta crystalline range until substantially all of the hard fat is crystallized in the beta phase.

5. A method for the manufacture of a stable, two-phase fluid oleaginous suspension, which method includes heating a mixture of an edible liquid triglyceride oil and about 10 percent to about 13 percent hard fat by weight of the suspension, said hard fat comprising a hydrogenated triglyceride oil containing at least about 85 percent $C_{18}$ and longer fatty acid radicals, and having an I.V. of not more than 2.0, holding said mixture at an elevated temperature for a time sufficient to melt the hard fat and destroy crystal nuclei, directly cooling the mixture to a temperature within the beta crystalline range for the suspension, and maintaining the temperature of the mixture within the beta crystalline range until substantially all of the hard fat is crystallized in the beta phase.

References Cited

UNITED STATES PATENTS

| 2,521,219 | 9/1950 | Holman et al. | 99—118 |
| 2,521,242 | 9/1950 | Mitchell | 99—118 |
| 2,815,285 | 12/1957 | Holman et al. | 99—118 |

OTHER REFERENCES

Linteris, L. L., et al.: "Journal of American Oil Chemists' Society," January 1958, vol. 35, pp. 28 to 32.

MAURICE W. GREENSTEIN, *Primary Examiner.*